United States Patent [19]

Banerjee, Sr. et al.

[11] Patent Number: 5,413,484
[45] Date of Patent: May 9, 1995

[54] BOARD GAME AND METHOD OF USE

[76] Inventors: Paul Banerjee, Sr.; Paul Banerjee, Jr., both of 30 Harley Road, Leeds LS13 4QF, United Kingdom

[21] Appl. No.: 846,816

[22] Filed: Mar. 6, 1992

[30] Foreign Application Priority Data

Mar. 8, 1991 [GB] United Kingdom ............... 9104944
Apr. 26, 1991 [GB] United Kingdom ............... 9109046

[51] Int. Cl.⁶ .......................................... G09B 19/22
[52] U.S. Cl. ......................... 434/128; 434/191; 273/272; 273/236
[58] Field of Search ............ 434/188, 191, 205, 209, 434/208, 128; 273/272, 236

[56] References Cited

U.S. PATENT DOCUMENTS

| | | | |
|---|---|---|---|
| 3,267,590 | 8/1966 | Browning | 273/272 |
| 3,472,514 | 10/1969 | Green | 273/272 |
| 3,827,161 | 8/1974 | Nelson . | |
| 4,114,290 | 9/1978 | Cooper . | |
| 4,193,602 | 3/1980 | Eliot et al. | 273/236 |
| 4,244,580 | 1/1981 | Hoyles | 273/272 |
| 4,316,612 | 2/1982 | Harder | 273/272 |
| 4,334,869 | 6/1982 | Wilcox et al. . | |
| 4,372,742 | 2/1983 | Wentworth . | |
| 4,565,374 | 1/1986 | Pak | 273/272 |
| 5,149,102 | 9/1992 | McGowan | 273/272 X |

FOREIGN PATENT DOCUMENTS

| | | |
|---|---|---|
| 997145 | 7/1965 | United Kingdom . |
| 1031121 | 5/1966 | United Kingdom . |
| 1031272 | 6/1966 | United Kingdom . |
| 1050292 | 12/1966 | United Kingdom . |
| 1578690 | 11/1980 | United Kingdom . |

Primary Examiner—Gene Mancene
Assistant Examiner—Jeffrey A. Smith
Attorney, Agent, or Firm—Rodman & Rodman

[57] ABSTRACT

The game apparatus includes a board bearing a regular pattern with a plurality of adjoining octagonal units arranged in horizontal rows and vertical columns and a plurality of square units interposed between the octagonal units. A series of markers each bearing a numeral are placed at the commencement of the game on the octagonal units. Two series of counters are provided, one for each player or team of players. Each series of counters includes a number of counters each of which bears a numeral. A first counter-yard is located in the region of one edge of the board for receiving the counters of one player or team of players. A second counter-yard is located in the region of the opposite edge of the board for receiving the counters of the other player or team of players.

10 Claims, 20 Drawing Sheets

|  | ½ Times Table | 1½ Times Table | 2½ Times Table | 3½ Times Table | 4½ Times Table | 5½ Times Table |
|---|---|---|---|---|---|---|
|  | 1×½ = ½ | 1×1½ = 1½ | 1×2½ = 2½ | 1×3½ = 3½ | 1×4½ = 4½ | 1×5½ = 5½ |
| 2 Times Table ⇨ | 2×½ = 1 | 2×1½ = 3 | 2×2½ = 5 | 2×3½ = 7 | 2×4½ = 9 | 2×5½ = 11 |
| 3 Times Table ⇨ | 3×½ = 1½ | 3×1½ = 4½ | 3×2½ = 7½ | 3×3½ = 10½ | 3×4½ = 13½ | 3×5½ = 16½ |
| 4 Times Table ⇨ | 4×½ = 2 | 4×1½ = 6 | 4×2½ = 10 | 4×3½ = 14 | 4×4½ = 18 | 4×5½ = 22 |
| 5 Times Table ⇨ | 5×½ = 2½ | 5×1½ = 7½ | 5×2½ = 12½ | 5×3½ = 17½ | 5×4½ = 22½ | 5×5½ = 27½ |
| 6 Times Table ⇨ | 6×½ = 3 | 6×1½ = 9 | 6×2½ = 15 | 6×3½ = 21 | 6×4½ = 27 | 6×5½ = 33 |
| 7 Times Table ⇨ | 7×½ = 3½ | 7×1½ = 10½ | 7×2½ = 17½ | 7×3½ = 24½ | 7×4½ = 31½ | 7×5½ = 38½ |

FIG. 7

| Game 1: tables 2,3 | | | | Game 5: tables 4,5 | | | |
|---|---|---|---|---|---|---|---|
| 6 | 8 | 9 | 10 | 4 | 20 | 32 | 15 |
| 12 | 14 | 15 | 16 | 10 | 24 | 16 | 45 |
| 18 | 20 | 21 | 24 | 12 | 40 | 35 | 24 |
| 27 | 12 | 30 | 8 | 28 | 15 | 36 | 25 |

| Game 2: tables 2,3 | | | | Game 6: tables 4,5 | | | |
|---|---|---|---|---|---|---|---|
| 9 | 16 | 15 | 20 | 24 | 35 | 15 | 10 |
| 21 | 24 | 12 | 8 | 45 | 40 | 35 | 24 |
| 30 | 4 | 18 | 27 | 32 | 25 | 8 | 20 |
| 10 | 8 | 14 | 6 | 16 | 30 | 28 | 45 |

| Game 3: tables 3,4 | | | | Game 7: tables 5,6 | | | |
|---|---|---|---|---|---|---|---|
| 8 | 9 | 12 | 36 | 10 | 12 | 25 | 30 |
| 15 | 16 | 18 | 20 | 15 | 18 | 50 | 36 |
| 21 | 32 | 27 | 40 | 20 | 24 | 35 | 42 |
| 24 | 28 | 30 | 32 | 40 | 48 | 45 | 60 |

| Game 4: tables 3,4 | | | | Game 8: tables 5,6 | | | |
|---|---|---|---|---|---|---|---|
| 6 | 12 | 21 | 40 | 10 | 30 | 45 | 15 |
| 8 | 15 | 28 | 18 | 18 | 35 | 60 | 24 |
| 9 | 24 | 27 | 32 | 20 | 48 | 40 | 25 |
| 16 | 30 | 20 | 36 | 36 | 35 | 54 | 12 |

FIG. 11

| Game 9: tables 6,7 | | | | Game 13: tables 8,9 | | | |
|---|---|---|---|---|---|---|---|
| 6 | 14 | 30 | 35 | 8 | 9 | 32 | 36 |
| 12 | 21 | 36 | 42 | 16 | 18 | 40 | 45 |
| 35 | 28 | 48 | 18 | 24 | 27 | 48 | 54 |
| 49 | 60 | 70 | 54 | 56 | 64 | 63 | 80 |

| Game 10: tables 6,7 | | | | Game 14: tables 8,9 | | | |
|---|---|---|---|---|---|---|---|
| 70 | 42 | 21 | 18 | 8 | 36 | 56 | 9 |
| 54 | 35 | 12 | 14 | 18 | 40 | 72 | 16 |
| 56 | 24 | 6 | 28 | 24 | 54 | 80 | 27 |
| 30 | 49 | 48 | 63 | 32 | 45 | 48 | 56 |

| Game 11: tables 7,8 | | | | Game 15: tables 9,10 | | | |
|---|---|---|---|---|---|---|---|
| 14 | 16 | 35 | 40 | 9 | 10 | 36 | 40 |
| 21 | 28 | 42 | 48 | 18 | 20 | 45 | 50 |
| 24 | 32 | 49 | 56 | 27 | 30 | 54 | 60 |
| 63 | 70 | 72 | 80 | 63 | 70 | 72 | 80 |

| Game 12: tables 7,8 | | | | Game 16: tables 9,10 | | | |
|---|---|---|---|---|---|---|---|
| 70 | 64 | 42 | 40 | 90 | 80 | 60 | 10 |
| 80 | 49 | 48 | 28 | 100 | 70 | 45 | 30 |
| 63 | 56 | 35 | 32 | 81 | 54 | 50 | 18 |
| 21 | 24 | 14 | 8 | 36 | 30 | 20 | 27 |

FIG. 12

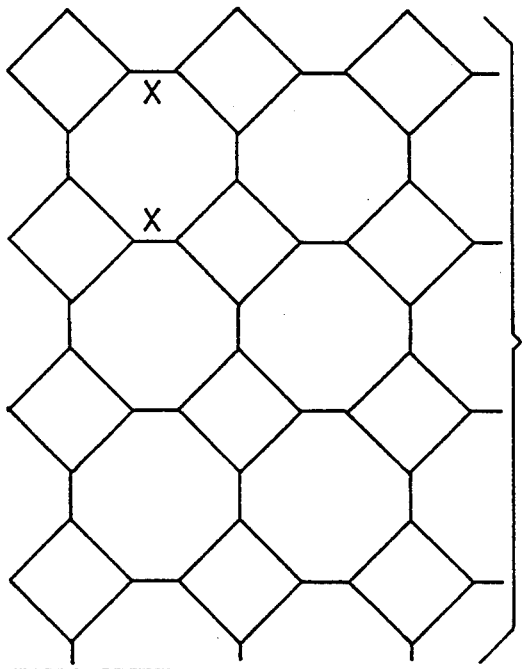

2

| One 2 | = 2 | Six 2's | =12 |
|---|---|---|---|
| Two 2's | = 4 | Seven 2's | =14 |
| Three 2's | = 6 | Eight 2's | =16 |
| Four 2's | = 8 | Nine 2's | =18 |
| Five 2's | =10 | Ten 2's | =20 |

3

| One 3 | = 3 | Six 3's | =18 |
|---|---|---|---|
| Two 3's | = 6 | Seven 3's | =21 |
| Three 3's | = 9 | Eight 3's | =24 |
| Four 3's | =12 | Nine 3's | =27 |
| Five 3's | =15 | Ten 3's | =30 |

4

| One 4 | = 4 |
|---|---|
| Two 4's | = 8 |
| Three 4's | =12 |
| Four 4's | =16 |
| Five 4's | =20 |

PLAYER ONE

TO FIGURE 14b

← Counter Yard

10

| Six 10's | =60 | One 10 | =10 | Six 10's | =60 |
|---|---|---|---|---|---|
| Seven 10's | =70 | Two 10's | =20 | | |
| Eight 10's | =80 | Three 10's | =30 | | |
| Nine 10's | =90 | Four 10's | =40 | | |
| Ten 10's | =100 | Five 10's | =50 | | |

*(10 table, read as):*

| One 10 | =10 | Six 10's | =60 |
|---|---|---|---|
| Two 10's | =20 | Seven 10's | =70 |
| Three 10's | =30 | Eight 10's | =80 |
| Four 10's | =40 | Nine 10's | =90 |
| Five 10's | =50 | Ten 10's | =100 |

9

| One 9 | = 9 | Six 9's | =54 |
|---|---|---|---|
| Two 9's | =18 | Seven 9's | =63 |
| Three 9's | =27 | Eight 9's | =72 |
| Four 9's | =36 | Nine 9's | =81 |
| Five 9's | =45 | Ten 9's | =90 |

FIG. 14a

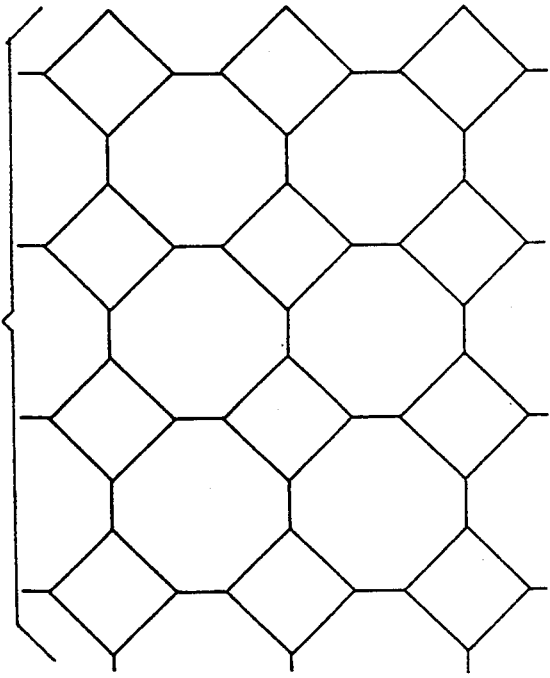

| 4 | | 5 | | 6 | |
|---|---|---|---|---|---|
| Six 4's = 24 | | One 5 = 5 | Six 5's = 30 | One 6 = 6 | Six 6's = 36 |
| Seven 4's = 28 | | Two 5's = 10 | Seven 5's = 35 | Two 6's = 12 | Seven 6's = 42 |
| Eight 4's = 32 | | Three 5's = 15 | Eight 5's = 40 | Three 6's = 18 | Eight 6's = 48 |
| Nine 4's = 36 | | Four 5's = 20 | Nine 5's = 45 | Four 6's = 24 | Nine 6's = 54 |
| Ten 4's = 40 | | Five 5's = 25 | Ten 5's = 50 | Five 6's = 30 | Ten 6's = 60 |

TO FIGURE 14a

PLAYER TWO

Counter Yard →

| 7 | | 8 | |
|---|---|---|---|
| One 7 = 7 | Six 7's = 42 | One 8 = 8 | Six 8's = 48 |
| Two 7's = 14 | Seven 7's = 49 | Two 8's = 16 | Seven 8's = 56 |
| Three 7's = 21 | Eight 7's = 56 | Three 8's = 24 | Eight 8's = 64 |
| Four 7's = 28 | Nine 7's = 63 | Four 8's = 32 | Nine 8's = 72 |
| Five 7's = 35 | Ten 7's = 70 | Five 8's = 40 | Ten 8's = 80 |

| One 2 = 2 | Six 2's = 12 |
|---|---|
| Two 2's = 4 | Seven 2's = 14 |
| Three 2's = 6 | Eight 2's = 16 |
| Four 2's = 8 | Nine 2's = 18 |
| Five 2's = 10 | Ten 2's = 20 |

3

| One 3 = 3 | Six 3's = 18 |
|---|---|
| Two 3's = 6 | Seven 3's = 21 |
| Three 3's = 9 | Eight 3's = 24 |
| Four 3's = 12 | Nine 3's = 27 |
| Five 3's = 15 | Ten 3's = 30 |

4

| One 4 = 4 |
|---|
| Two 4's = 8 |
| Three 4's = 12 |
| Four 4's = 16 |
| Five 4's = 20 |

PLAYER TWO

TO FIGURE 15b

Counter Yard →

10

| One 10 = 10 | Six 10's = 60 |
|---|---|
| Two 10's = 20 | Seven 10's = 70 |
| Three 10's = 30 | Eight 10's = 80 |
| Four 10's = 40 | Nine 10's = 90 |
| Five 10's = 50 | Ten 10's = 100 |

9

| One 9 = 9 | Six 9's = 54 |
|---|---|
| Two 9's = 18 | Seven 9's = 63 |
| Three 9's = 27 | Eight 9's = 72 |
| Four 9's = 36 | Nine 9's = 81 |
| Five 9's = 45 | Ten 9's = 90 |

FIG. 15a

BOARD GAME AND METHOD OF USE

BACKGROUND OF THE INVENTION

The present invention relates to apparatus for use in teaching and explaining certain mathematical operations, and to apparatus for use in reinforcing the skills and knowledge thus imparted.

SUMMARY OF THE INVENTION

The invention is intended for use by children from age 6 upwards, but it should be borne in mind that the invention is not restricted to use by any one particular age group, and could equally be used by any person or group of persons wishing to aquire the particular skills and knowledge relating to the apparatus of the invention.

The invention is primarily directed to the teaching and reinforcement of the knowledge and skills relating to multiplication and division, but it should be appreciated that the invention could also be utilized to teach other mathematical skills.

According to a first aspect of the present invention, there is provided apparatus for use in teaching the skills and knowledge pertaining to a mathematical operation performed on two or more numerals, the apparatus comprising:

a first display area bearing or for displaying thereon a first set of numerals;

a second display area bearing or for displaying theron a second set of numerals;

a third display area bearing or for displaying thereon a third set of numerals, each of said third set of numerals being the result of performing said mathematical operation on a numeral from the first set and a numeral from the second set; and a fourth display area bearing or for displaying thereon indicia for the purpose of illustrating said mathematical operation.

In a first embodiment, the first display area bears thereon a first set of numerals, the second display area includes reception means for receiving markers bearing numerals comprising the second set of numerals, the third display area includes reception means for receiving markers bearing numerals comprising the third set of numerals, and the fourth display area includes reception means for receiving indicia for the purpose of illustrating said mathematical operation.

However, in a second embodiment, the reception means are not included and the numerals and indicia are printed or written/drawn directly onto the apparatus.

The numerals may be whole numbers (integers) e.g. 2, 3, 4 etc or fractions eg ½. ⅓ etc. or mixed numbers e.g. 1 ½, 2 ½ etc.

The invention is particularly well suited to the demonstration and teaching of multiplication tables, for example 2 times up to 10 times, in which case the first set of numerals comprises the numerals 1–10 and the second set of numerals comprises ten of the numeral "2", or ten of the numeral "3", or ten of the numeral "4" etc. up to ten of the numeral "10".

In the first embodiment, the first and second display areas are conveniently arranged in the form of a clock face of at least two concentric rings, an outer ring bearing the first set of numerals arranged equidistantly around the ring, and an inner ring bearing a series of reception means for the second set of numerals arranged equidistantly around its perimeter such that each numeral of the first set appears adjacent a numeral or corresponding reception means of the second set. There may also be provided an intermediate ring between the inner and outer rings which bears a set of symbols representing the mathematical operation to be performed on the numerals from the first and second sets.

The third and fourth display areas take the form of series of circles (hereinafter referred to as "satellite circles") each one being located adjacent a pair of numerals from the first and second sets, the reception means for the numerals of the third set being approximately in the center of each circle. The reception means for the illustrative indicia comprise a series of recesses in each satellite circle for holding indicia which serve as an aid to illustrating details of the mathematical operation being taught. In the illustrated embodiment, there are ten recesses in each satellite circle.

In the second embodiment, there are no reception means and the first, second and third numerals and the illustrative indicia are displayed directly on the apparatus.

The invention will now be described further with particular reference to the teaching of multiplication tables from 2 times up to 10 times, beginning first of all with the first embodiment.

The teacher begins with the 2 times table by inserting ten small markers or "cuboids". each bearing the numeral "2" in the series of ten reception means in the second display area. He then says "1 times 2" and simultaneously places a counter (indicia) in each of the first two recesses of the satellite circle adjacent the numeral "1" of the outer ring (i.e the first satellite circle"). The pupil then adds the the number of counters in the first satellite circle, which is two, and places a cuboid bearing the answer "2" in the reception means at the center of the first satellite circle.

The teacher then proceeds to the second satellite circle, i.e that adjacent the numeral "2" of the outer ring, and places a counter in each of the first two recesses of the second satellite circle. saying "2 times 2" as he does so. The pupil and/or the Teacher then adds up the two counters from the first satellite circle and the two counters from the second satellite circle and concludes that the answer is 4, a cuboid bearing this answer then being placed in the further reception means at the center of the second satellite circle. This process continues around the clock face, each time the pupil adding up all of the counters in the current and preceding satellite circles to arrive at the correct answer. When the 2 times table has been completed, the teacher moves on to the 3 times etc. tables by removing all of the "2" cuboids from the reception means in the inner ring of the first display area and replacing them with "3" "4" or "5" etc cuboids according to the table being taught.

In the second embodiment, a separate apparatus is required for each multiplication table, and the pupil simply observes the numerals and counts the indicia in response to questions put to him by the teacher.

The first aspect of the present invention also provides for a simultaneous chart bearing all of the tables with spaces or location means for the answers to be inserted by the pupil. Preferably, the answers are filled in by inserting cuboids bearing numerals, the arrangement being such that only a cuboid bearing the correct answer for a particular multiplication will fit in the relevant locating means, thus revealing any mistakes made in using the apparatus described hereinbefore.

According to a second aspect of the invention there is provided practice apparatus for use in practicing the skills taught by use of the apparatus of the first aspect of the invention, said practice apparatus including a board divided into a number of units, a series of discs each bearing a numeral to be placed on said units, and a series of counters each bearing a numeral for placing on said board adjacent said discs in accordance with a set of rules.

According to a third aspect of the present invention there is provided apparatus for playing a game, the apparatus comprising a board divided into a number of units, at least some of which bear numerals, a series of markers at least some of which bear numerals and are placed initially on the units of the board bearing the corresponding numerals, and two series of counters, one for each player or team of players, at least some of the counters of each of these two series bearing numerals and being used to capture the markers in accordance with a set of rules in such a manner as to illustrate a mathematical operation such as multiplication.

Preferably, each series of counters bear the numerals "2" to "10" with one counter in each series being blank, i e bearing no numeral at all.

Conveniently, each of the two series of counters are a different color to indicate that they belong to different players or teams of players, and the series of markers are again of a different colors or colors to differentiate them from the counters.

The series of markers may all be of one color, or they may be two or more different colors, for example yellow and red, with the yellow markers being worth a higher score than the red markers.

As will be seen from the specific embodiment of the game which is described hereinafter, playing the game reinforces the knowledge of multiplication tables learned from use of the apparatus according to the first aspect of the invention. If required, the board may also include the multiplication tables printed around the edge of the main playing area, for reference during play of the game.

The same design of game board can, with certain modifications to be described hereinafter, also be used as a teaching aid, in conjunction with either embodiment of the first aspect of the invention.

BRIEF DESCRIPTION OF THE DRAWINGS

FIG. 7 illustrates times tables of fractions; and

FIGS. 11 and 12 illustrate a set of games and multiplication tables for use with the game board of FIG. 15 and the practice board of FIG. 14, respectively

FIGS. 14a and 14b are divided sections of a practice board for use in playing the multiplication tables of FIGS. 11 and 12; and FIGS. 15a and 15b are divided sections of a game board for use in playing the games of FIGS. 11 and 12.

DESCRIPTION OF PREFERRED EMBODIMENTS

Figure 1A:
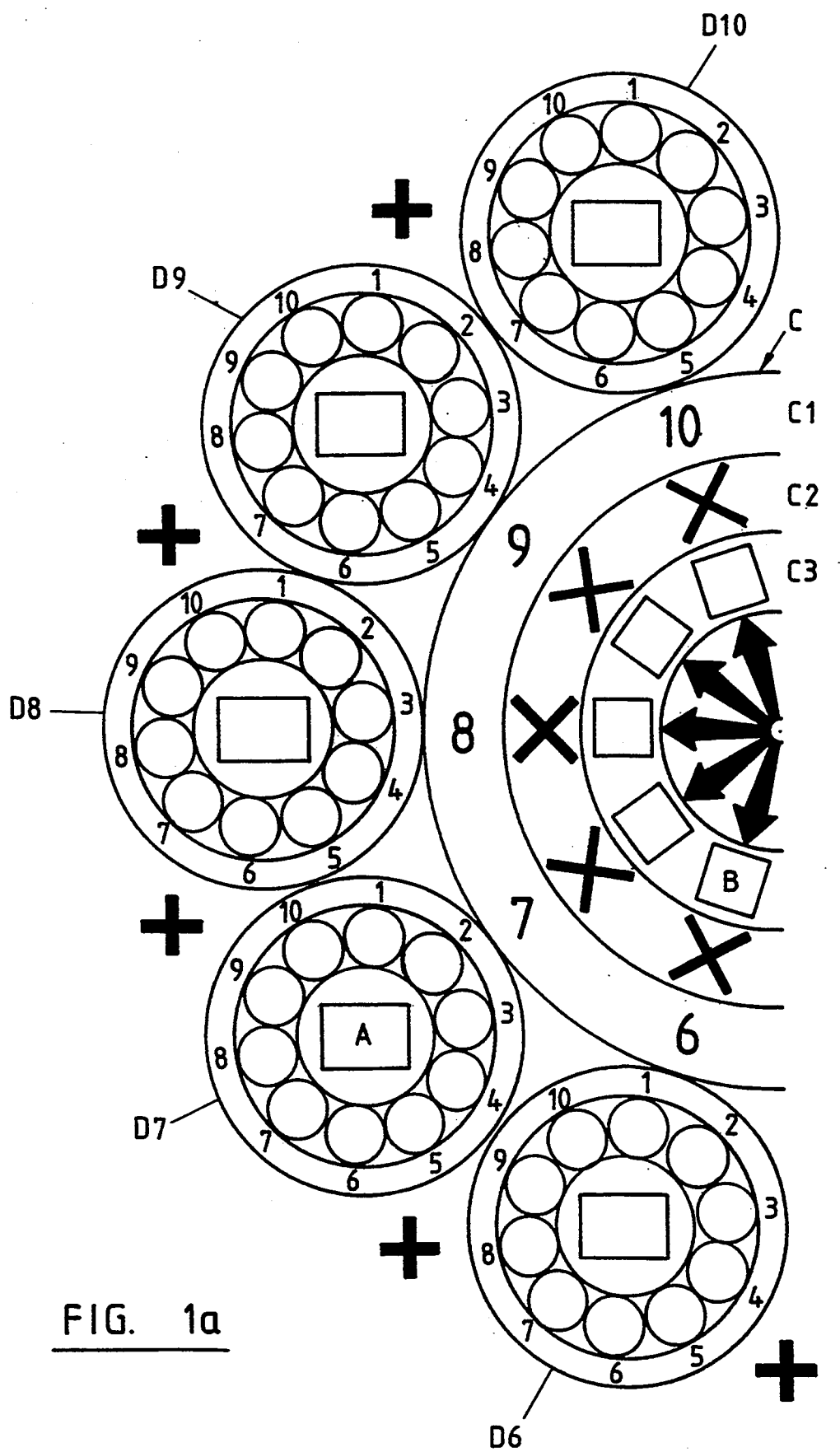
FIGS. 1a and 1b are divided sections of a plan view of a first embodiment of the apparatus according to the first aspect of the invention.
Figure 1B:
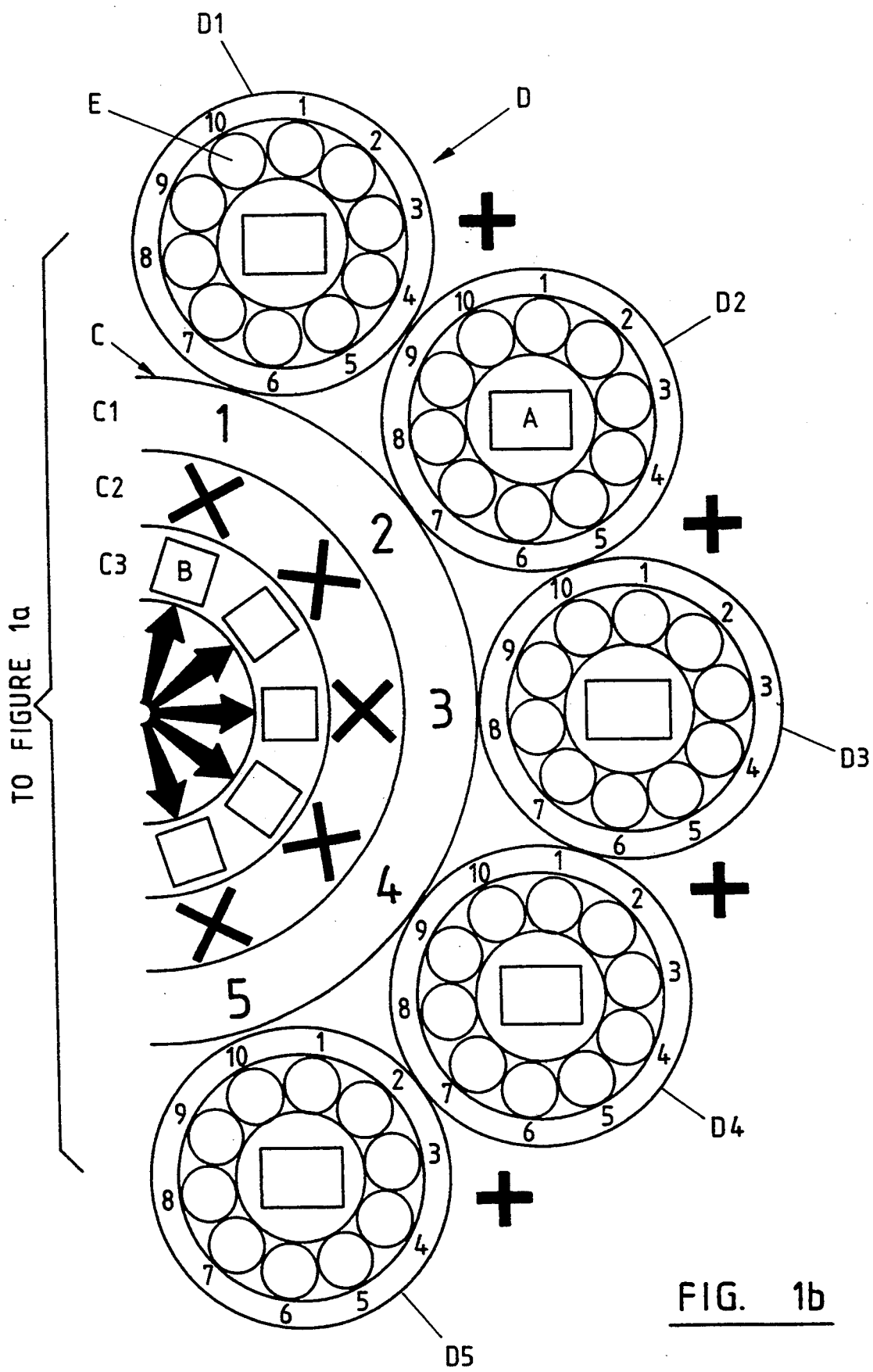

Referring first of all to FIGS. 1a and 1b, a first embodiment of the first aspect of the invention comprises in one form first and second display areas in the form of inner and outer concentric rings $C^3$ and $C^1$ respectively, and third and fourth display areas D comprising ten satellite circles designated D1 to D10 and arranged around the first and second display area C, such that satellite circle D1 is adjacent the numeral "1" of the outer ring C1, the second satellite circle D2 is adjacent the numeral "2", the third satellite circle D3 is adjacent the numeral "3" and so on. An intermediate ring C2 bears representations of the mathematical operation, e.g. "x" for multiplication.

The inner ring C3 of the first display area C has ten reception areas designated B, and each satellite circle has a third display area including reception area designated A. In addition, each satellite circle has a fourth display area including reception means in the form of ten generally cup shaped recesses E which are numbered 1 to 10.

A detailed description now follows of use of the apparatus shown in FIG. 1 to build up the 2 times table.

The teacher puts 10 cuboids each marked with number 2 on the ten reception areas (marked B) on the clock. He reads out loudly from the clock face "1×2" and puts 2 colored plastic balls in the recesses marked 1 and 2 on the first satellite circle D1. He then reads out loudly again "1×2=2" and places a cuboid with the answer "2" in the reception area marked "A" in the middle of the first satellite circle D.

Next he reads out loud "2×2" from the clock face and places two colored balls in the recesses marked 1 and 2 on the second satellite circle D2. He loudly adds up 2 sets of 2 colored balls in the first 2 satellite circles D1 and D2 and declares that "2×2=4". He places a cuboid with the answer "4" on the second reception area marked A in the middle of the second satellite circle.

Next he reads out loud "3×2" from the clock face and places 2 colored balls in the recesses marked 1 and 2 on the third satellite circle D3. He loudly adds up 3 sets of 2 colored balls in the first 3 satellite circles D1 to D3 and declares that "3×2=6". He places a cuboid with the answer "6" on the third reception area marked A in the middle of the third satellite circle D3.

Next he reads out loudly "4×2" from the clock face and places 2 more colored balls in the recesses marked 1 and 2 on the fourth satellite circle D4. He loudly adds up 4 sets of 2 colored balls in the first 4 satellite circles D1 to D4 and declares that "4×2=8". He places a cuboid with the answer "8" on the fourth reception area marked A in the middle of the fourth satellite circle D4.

Figure 3:
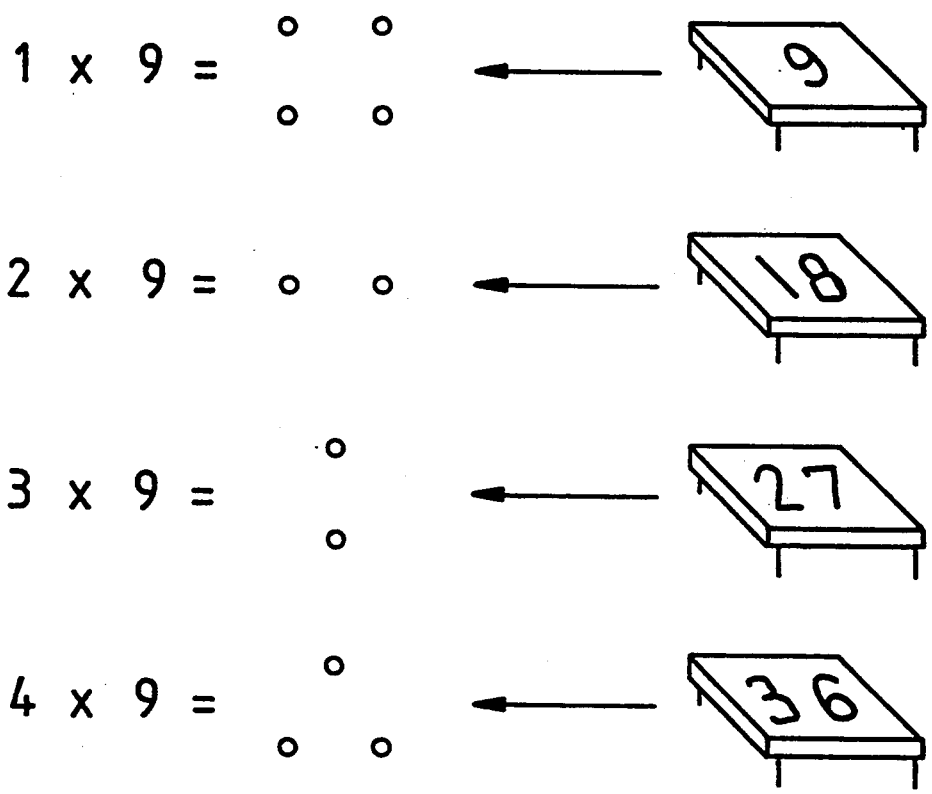
FIGS. 3 illustrates part of a chart for use in conjunction with the apparatus shown in FIG. 1.

Gradually the teacher builds up the whole of the 2 times table with the help of the pupils. A separate board which charts all the times table (2-10) but without answers will be supplied. The children simultaneously fill up the answers on the 2 times table chart as read (or added up) from the satellite circle. In the process any mistakes made in the satellite circles will be revealed as the chart will not accept a wrong answer. They will gradually build up the table from 2-10. Part of such a chart is illustrated in FIG. 3. in which it can be seen that th space for each answer has a particular arrangement of holes, and only the tile cuboid bearing the correct answer has the correct configuration of pin means to fit in the holes.

As can be seen from FIGS. 1a and 1b, the game has a clock face. The numbers on the clock face start from 1 and go up to 10. Next to each number there is an X sign. Next to each X sign there is a reception area marked B. Every reception area B is pointed by an arrow from the centre of the clock face.

Figure 2A:
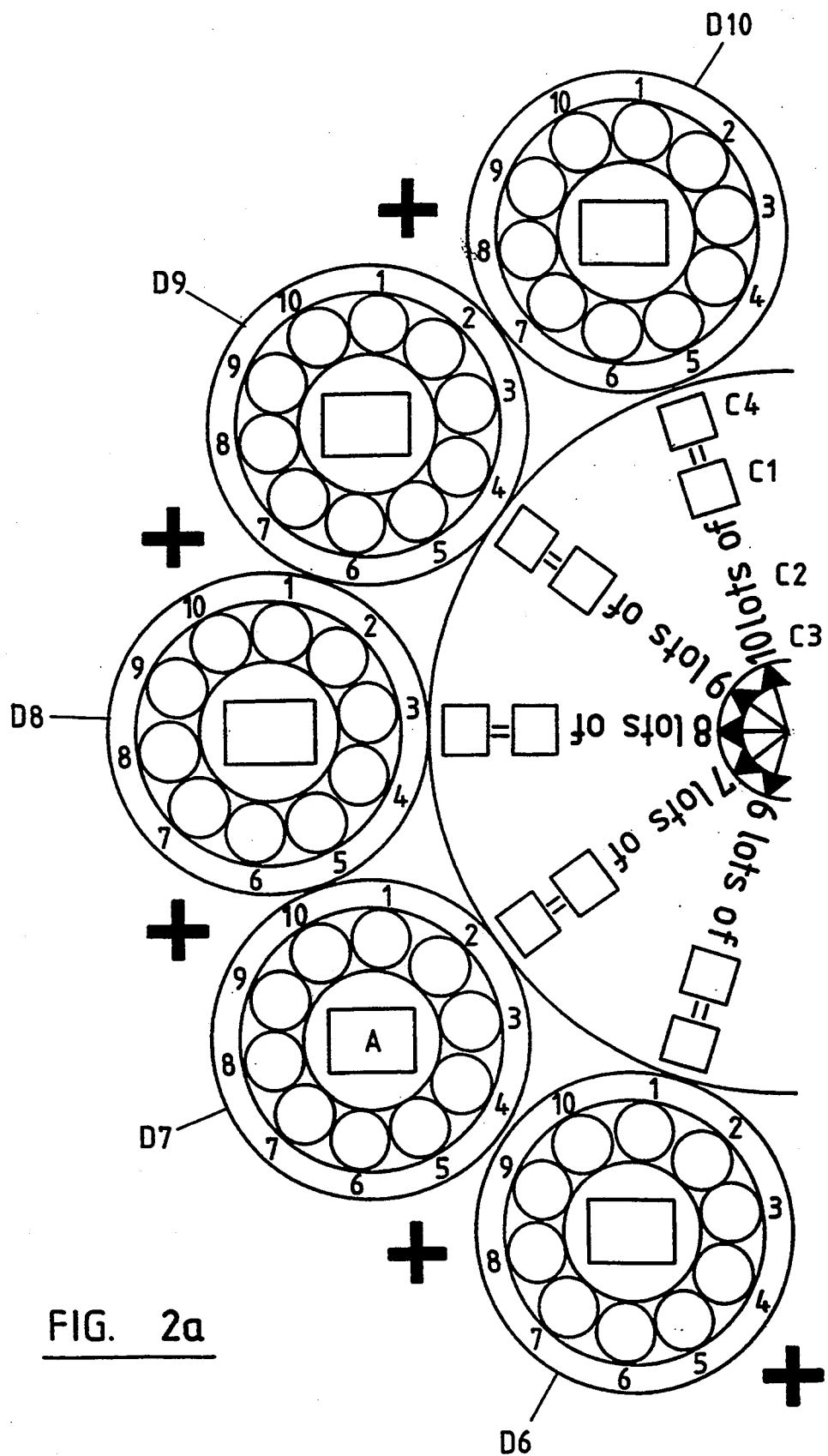
FIGS. 2a and 2b are divided sections of an alternative form of the embodiment shown in FIG. 1
Figure 2B:
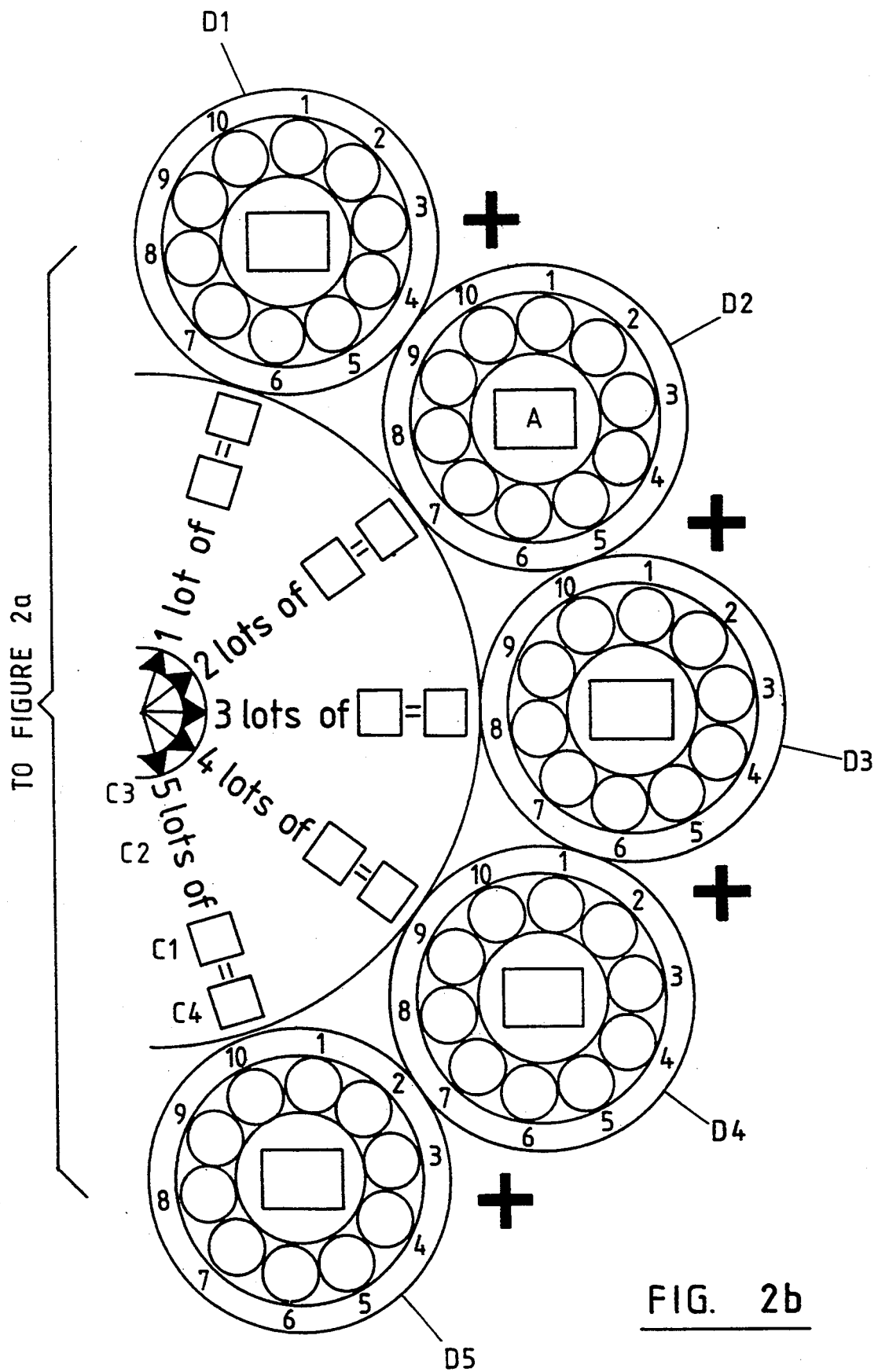

The embodiment shown in FIG. 1 may take an alternative form shown in FIGS. 2a and 2b. This has the same third and fourth display areas comprising ten satellite circles D1, to D10 but the remaining display areas are arranged differently. Specifically, the inner ring C3 comprises a first series of numbers 1 to 10, the outer ring C1 comprises reception means for receiving a second set of numbers, the intermediate ring C2 comprises a series of "lots of" to represent the multiplication operation and there is also a further outer ring C4 comprising reception means for receiving the third set of numbers, each of these numbers being the same as the answer in reception area A of the corresponding satellite circle. The satellite circles D1 to D10 are used in the same way as described on pages 3 to 4, while the answers as well as being placed in the centres of the satellite circles, are also placed in the corresponding reception means of further outer ring C4. For each table, the appropriate number would be placed in each of the reception means of ring C, e.g. 2 for the 2 times table, 3 for the 3 times table, etc.

Figure 4:
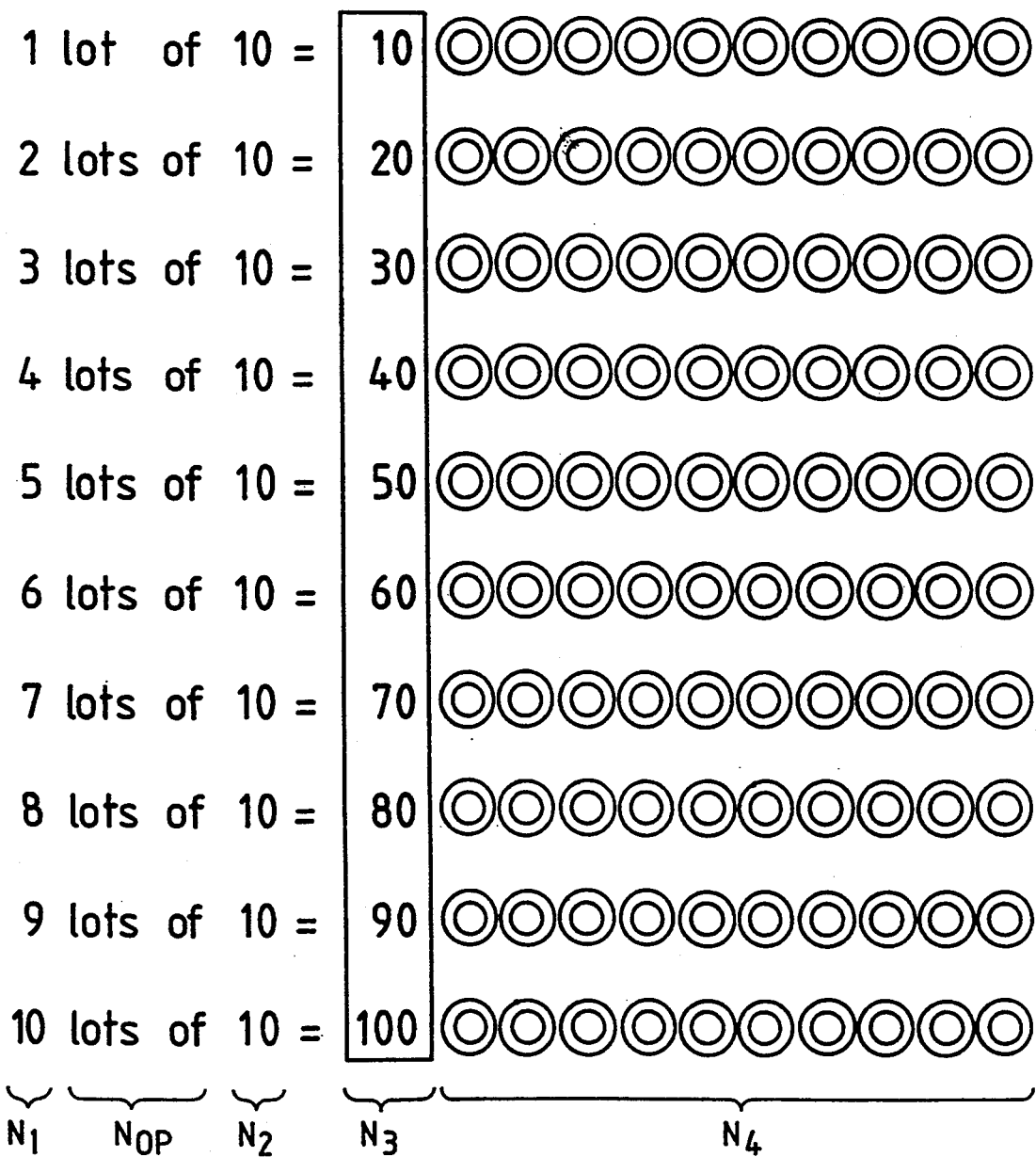
FIG. 4 is a plan view of an example of a second embodiment.

Referring now to FIG. 4, a second embodiment of the first aspect of the invention is shown, and comprises for each multiplication table, a first display area $N_1$ bearing the first set of numerals, a second display area $N_2$ bearing the second set of numerals, a third display area $N_3$ (the number line) bearing the third set of numerals, and a fourth display area $N_4$ bearing the illustrative indicia, e.g. colored circles representing the counters or marbles used in the first embodiment. A further display area, $N_{op}$ indicates the mathematical operation, e.g. the words "lots of". The method of use of this embodiment will now be described in detail.

Parent asks the following

1. Look at it and suggest what it might be used for.
2. What are those round things on the right half of the picture? Answer: marbles.
3. How many different colors of marbles can you see? Answer: 4 different colors.
4. How many lines of marbles are there? Answer: 10 lines of marbles. Children count all the lines.
5. How many marbles are on each line? Answer: 1 lot of 10 marbles on each line. Children count each line.
6. How many lots of 10 colors marbles:
   a) are on the first line? Answer: 1 lot of 10 (see step 1)
   b) are on the first 2 lines? Answer: 2 lots of 10 (see step 2)
   c) are on the first 3 lines? Answer: 3 lots of 10 (see step 3)
   d) are on the first 4 lines? Answer: 4 lots of 10 (see step 4)
   e) are on the first 5 lines? Answer: 5 lots of 10 (see step 5)
   f) are on the first 6 lines? Answer: 6 lots of 10 (see step 6)
   g) are on the first 7 lines? Answer: 7 lots of 10 (see step 7)
   h) are on the first 8 lines? Answer: 8 lots of 10 (see step 8)
   i) are on the first 9 lines? Answer: 9 lots of 10 (see step 9)
   j) are on the first 10 lines? Answer: 10 lots of 10 (see step 10).
7. Point out: multiplication by 10, FIG. 1b.
8. Read aloud, the 10 numbers, from the *vertical number line* from FIG. 1. Answer: 10, 20, 30, 40, 50, 60, 70, 80, 90, 100.
9. Read step 1 to step 10. Answer: Children take their turn to read.

Next to each number on the clock face there is an outer circle D1-DIO called the satellite circle. Each satellite (outer) circle has numbers ranging from 1 to 10, on its rim. At the centre of the satellite (outer) circle there is a rectangular reception area marked A which can accommodate 2 cuboids to show the required answer.

Referring now to FIGS. 5a and 5b and 6a and 6b apparatus for playing a game in accordance with the second aspect of the invention will now be described in more detail.

The game board comprises a central playing area F which is divided into 169 units, 36 of these units bear numerals which are themselves answers to the multiplication tables which appear for reference purposes around the edge of the playing area F.

Figure 5A:
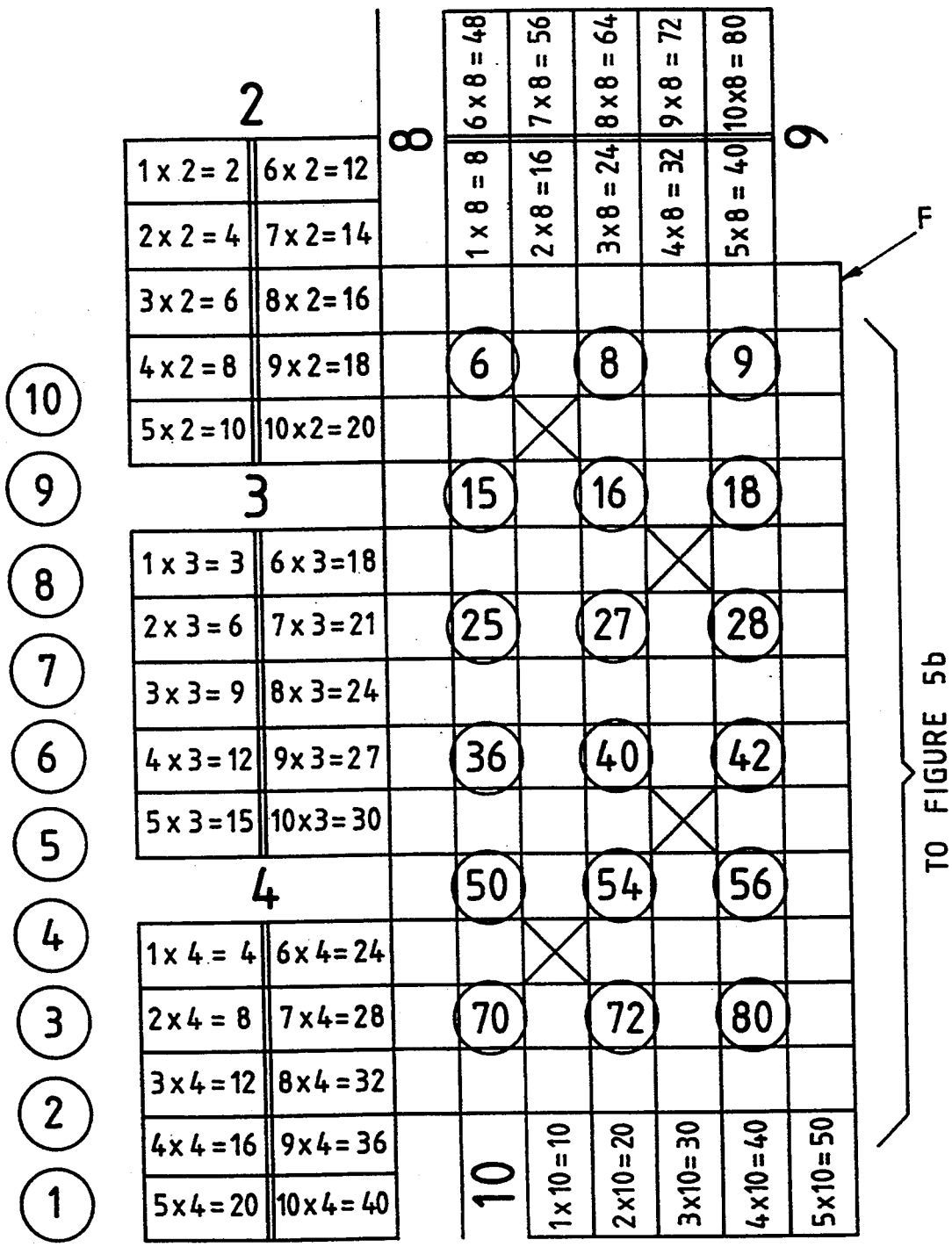
FIGS. 5a and 5b are divided sections of a plan view of one version of the game board in accordance with the second aspect of the present invention.
Figure 5B:
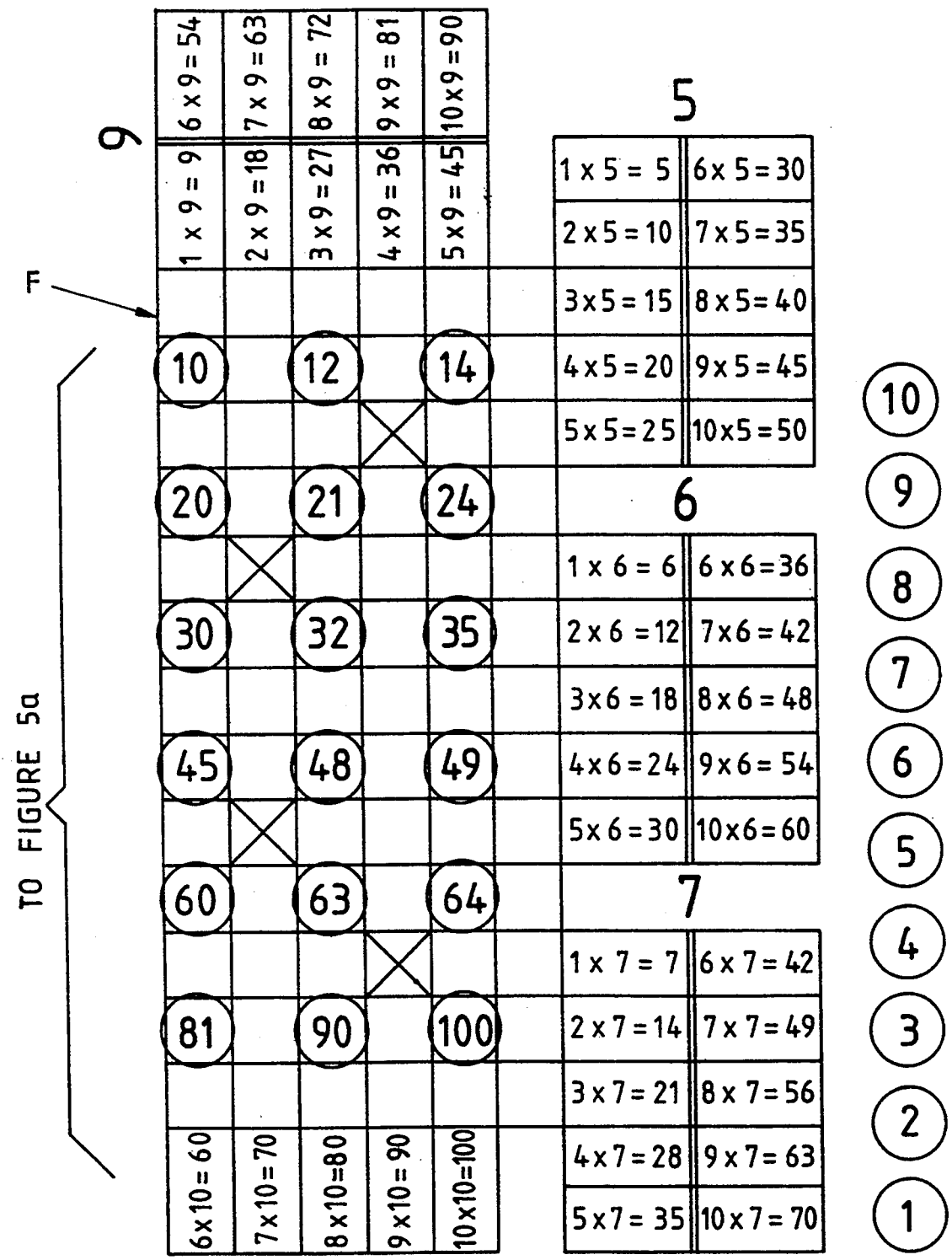

In one version of the game, shown in FIGS. 5a and 5b the 169 units are all square. However, in an alternative version of the game shown in FIG. 6a and 6b there are 36 octagonal units which bear the numerals and 49 square units which are interposed between the octagonal units.

The game is played using up to 36 markers or discs each bearing the same numbers as appear on the main playing area F of the board, and these are placed on the corresponding numeral on the board in accordance with the rules described hereinafter. Each player or team of players has a set of ten counters which he uses to capture the discs previously placed on the board. The manner in which the game is played will now be described in more detail.

There are altogether 36 discs, comprising 18 red and 18 yellow discs.

Practicing Times Tables

1. Practice of 2 and 3 times tables: Players place on the board all the discs with numbers starting from 6 and up to 30. They will notice that discs with numbers 25 and 28 cannot be captured and the game finishes without capturing them.

2. Practice of 2, 3, 4 times tables:
Players place on the board discs with numbers starting from 6 and up to 40. They will notice that discs with numbers 25 and 35 cannot be captured. The game finishes without capturing them.

3. Practice of 2, 3, 4, 5 times tables:

Players place on the board discs with numbers starting from 6 and up to 50. They will notice that numbers 42, 48 and 49 cannot be captured. The game finishes without capturing them.

4. Practice of 2, 3, 4, 5 and 6 times tables: Players place on the board all the discs with numbers starting from 6 and up to 60. The discs with numbers 49 and 56 cannot be captured. The game finishes without capturing those discs.

Various different games can be played, and these are described below as games 1 to 4.

Game one is played in 3 parts; Part A, Part B and Part C.

Part A is played with 12 discs comprising any 6 red and 6 yellow discs. There are 6 number-lines on the board. Each number-line must have 2 discs only, one red and one yellow. Each disc, is placed on a square or octagon having the same number as on the disc.

Part B and Part C are played with 12 discs each from the remaining discs. Discs are comprising any 6 red and any 6 yellow discs. No disc is repeated on Part B or Part C of the game. (See the rules of the game)

Game 2 is played in 2 halves. Each half is played with 18 discs, comprising any 9 red and any 9 yellow discs. There are 6 number-lines on the board. Each number-line must have a mixture of 3 discs belonging to red and yellow colors. Each disc is placed on a square having the same number as on the disc. No disc is repeated on the second half of the game (see the rules of the game).

Game 3 is played in 2 halves. The first half is played with 24 discs, comprising any 12 red discs and any 12 yellow discs. There are 6 number-lines on the board. Each number line must have 4 discs, 2 yellow and 2 red. The second half is played with 24 discs, comprising any 12 red and any 12 yellow discs. Discs can be repeated but care should be taken that the discs not used in the first half must be included in the second half. Each number-line must have 4 discs, 2 yellow and 2 red discs, (see the rules of the game).

Game 4 is played using all 36 discs. (Adults are advised to participate in the above games with the children).

Suggestions for optional games layout are as follows:
Game X
First half: only the red discs are used.
Second half: only the yellow discs are used.
Game Y
First half: only the first, third and fifth number-lines are used. and
Second half: only the second, fourth and sixth number lines are used.
Game E
Players can make their own games.
Rules of the games
1. Only two players can play this game.
2. Only 2 sets of counters of different colors are used.
3. Each player puts his set of 10 counters on the specified area known as the counter yard. Pieces are marked blank, 2, 3, 4, 5, 6, 7, 8, 9, 10.
4. 36 discs comprising 18 red and 18 yellow can go on the board. Each disc is marked with a number and placed on a square or octagon having the same number.
5. To make a capture 2 counters must be of the same set (color) each lying on either side of the disc and the product of the counter-numbers must equal the disc number. The player removes the disc as his prize.
6. A player on his turn can bring a maximum of 2 counters from the counter-yard.

a. The counters may jointly capture a single disc, or
b. The counters may each separately capture a disc, or
c. One counter may capture a disc and the other may target a disc, or
d. Both the counters may each separately target a disc, or
e. They may be placed anywhere on the square.

7. Capture made by one or both the counters brought directly from the counter-yard does not gain another chance for the player to play again on that turn and the turn is passed over to his opponent.

8. A wrong move is penalized. The defaulting player forfeits one of his captured red discs to his opponent. The disc intended to be captured stays in its place. The wrong move is returned to its original position. The turn is passed on to his opponent.

9. A player is not allowed to move his opponent's counters.

10. The game finishes when no counters that can be captured are left on the board.

11. Each red disc carries one mark and each yellow disc carries two marks.

12. The winner collects the maximum number of points totaled from all the games played.

13. A blank counter is used for the capture of square numbers such as 9, 16, 25, 36, 49, 64, 81, 100. A blank counter placed against a disc assumes the number of the counter (of the same color) on the opposite side of that disc. If a player wants to capture the square number 16, he must have a blank counter on one side and a counter with 4 on the opposite side. Here the blank counter assumes the number 4 for that capture. Result $4 \times 4 = 16$. A capture is made.

Natural Progression to Times Tables of Fractions

This invention is particularly well suited to the demonstration and teaching of multiplication of mixed numbers and whole numbers.

Example:

$1 \times \frac{1}{2}, 2 \times \frac{1}{2}, 3 \times \frac{1}{2} \ldots 10 \times \frac{1}{2}$ $1 \times 1\frac{1}{2}, 2 \times 1\frac{1}{2}, 3 \times 1\frac{1}{2} \ldots 10 \times 1\frac{1}{2}$ $1 \times 9\frac{1}{2}, 3 \times 9\frac{1}{2} \ldots 10 \times 9\frac{1}{2}$ Building up $\frac{1}{2}$ Times Table with the help of the Teacher Referring to FIG. 1, teacher puts 10 cuboids each marked with the fraction $\frac{1}{2}$ on the 10 grooves (marked B) on the clock face. He reads out loudly from the clock face "$1 \times \frac{1}{2}$" and puts half a ball on the groove marked 1 on the first satellite (or 1st outer) circle. He then reads out loudly again $1 \times \frac{1}{2} = \frac{1}{2}$ and places a cuboid with the answer $\frac{1}{2}$ in the groove marked "A" in the middle of the first satellite circle.

Next he reads out loud "$2 \times \frac{1}{2}$" and places half a ball in the groove marked 1 in the second satellite (or 2nd outer) circle. He loudly adds up 2 sets of $\frac{1}{2}$ balls and declares $2 \times \frac{1}{2} = 1$. He places a cuboid with the answer 1 on the second groove marked "A" in the middle of a second satellite (or 2nd outer) circle.

Next he reads out loud "$3 \times \frac{1}{2}$" from the clock face and places $\frac{1}{2}$ a ball in the groove marked 1 on the 3rd satellite circle. He loudly adds up 3 sets of half balls in the first 3 satellite circles and declares that "$3 \times \frac{1}{2} = 1\frac{1}{2}$".

He places a cuboid with answer 1½ on the 3rd groove marked "A" in the middle of the 3rd satellite circle.

Next he reads out loud "4×½" from the clock face and places ½ of a ball in the groove marked 1 on the 4th satellite circle. He loudly adds up 4 sets of ½ balls in the 4 satellite circles and declares that 4×½=2. He places a cuboid with the answer "2" on the 4th groove marked "A" in the middle of the 4th satellite circle.

Gradually the teacher builds up the whole of the ½ times table with the help of the pupils. A separate board which charts all the times tables (½ to 9½) but without answers will be supplied. The children simultaneously file the answers on the ½ times table. The teacher helps the children to build up times tables 2½, 3½, sequentially up to 9½.

Figure 8A:
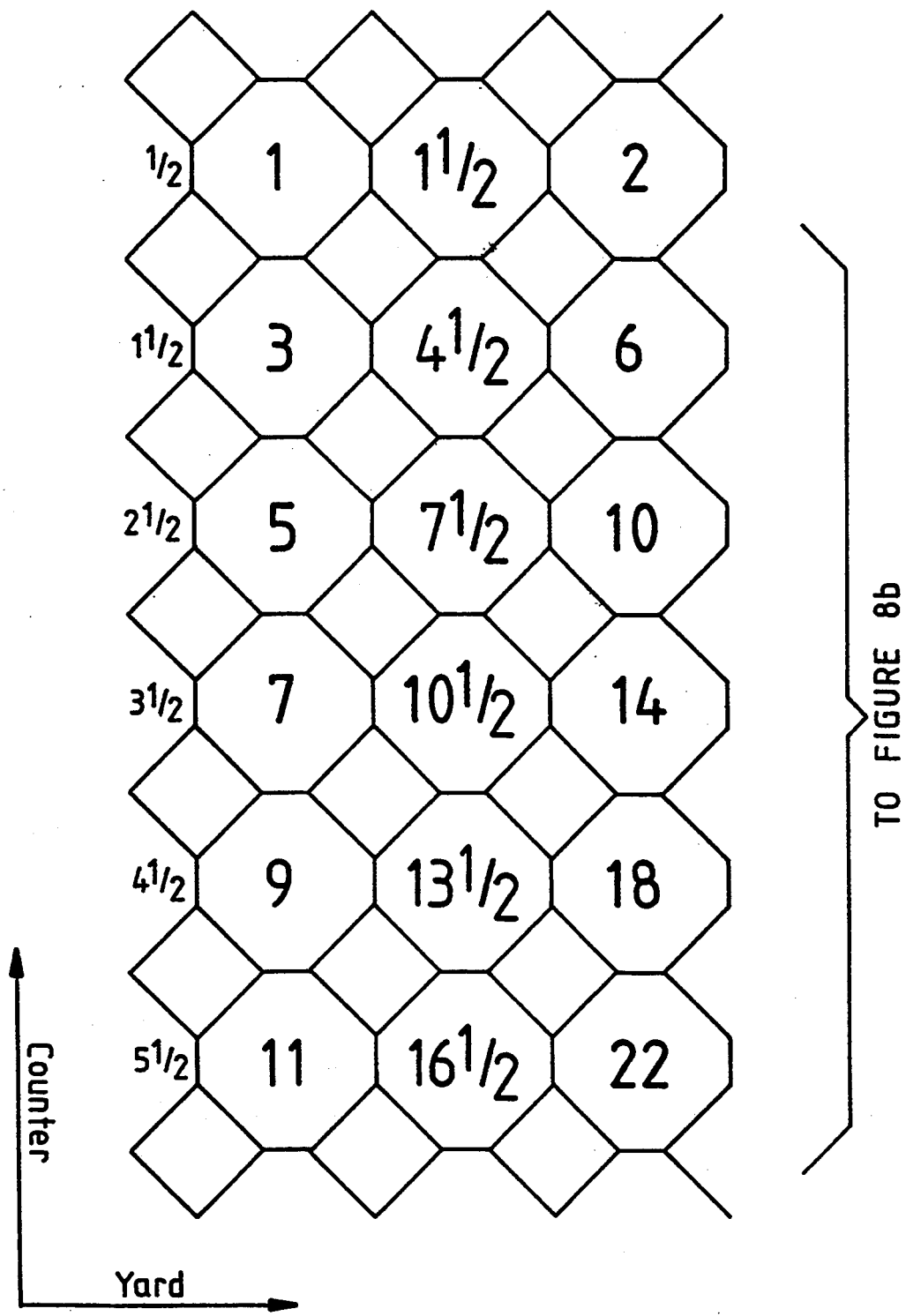
FIGS. 8a and 8b are divided sections of a modified version of the game board, for use in reinforcing the skills of multiplying fractions.
Figure 8B:
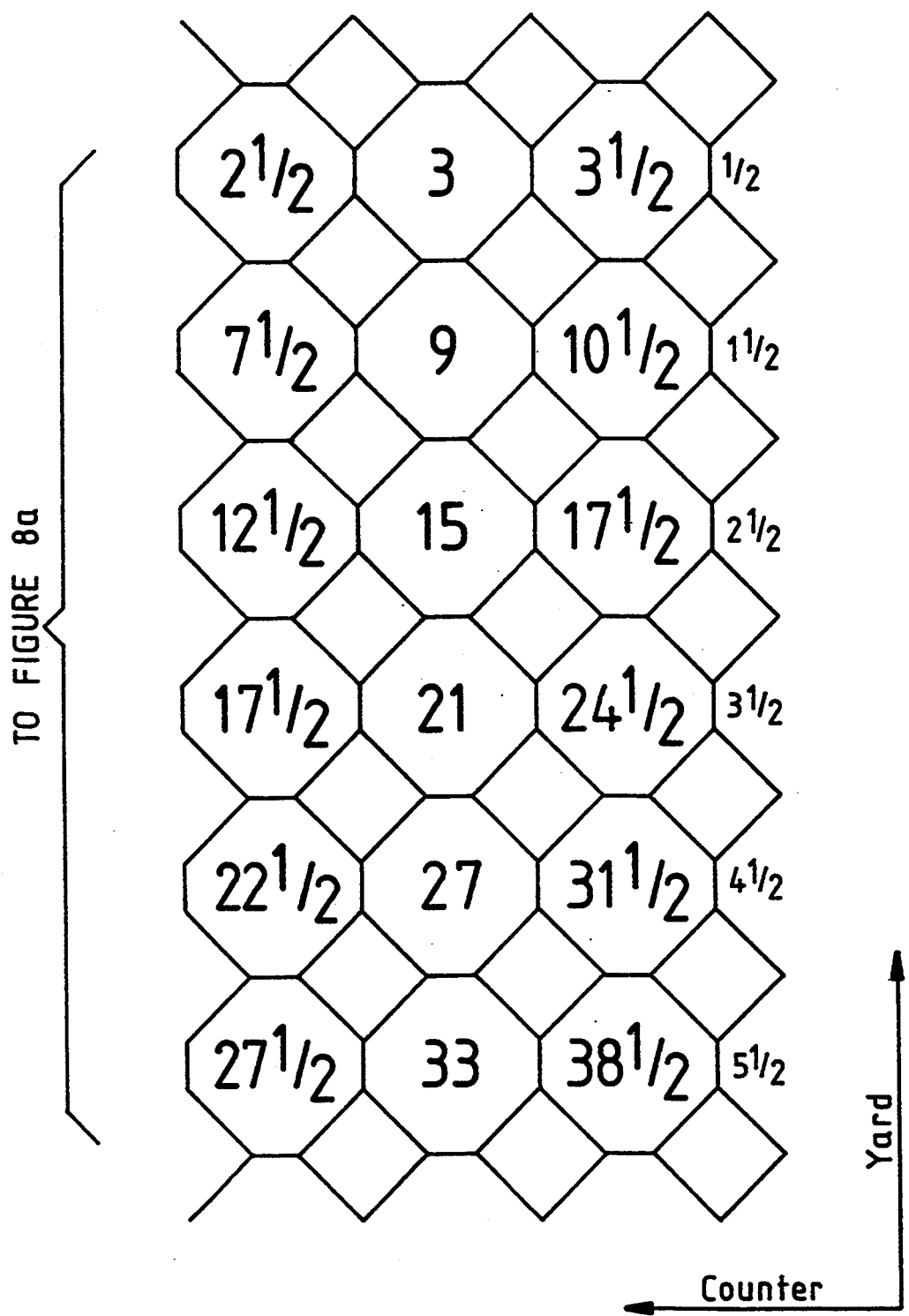

Referring now to FIG. 7 and 8a and 8b, a similar game to that played on the board of FIGS. 5a and 5b and 6a and 6b can be played on the board illustrated in FIG. 3A, which illustrates the principles of multiplication of fractions. Such a game is played as follows:

1. Players must revise the times tables (½ to 5½) as shown in FIG. 7 before the game.

2. The opposite sides of the square on the board show fractions from ½ to 5½ written in small form along the sides.

3. Each number line represents the times table of the fraction next to it.

Figure 6A:
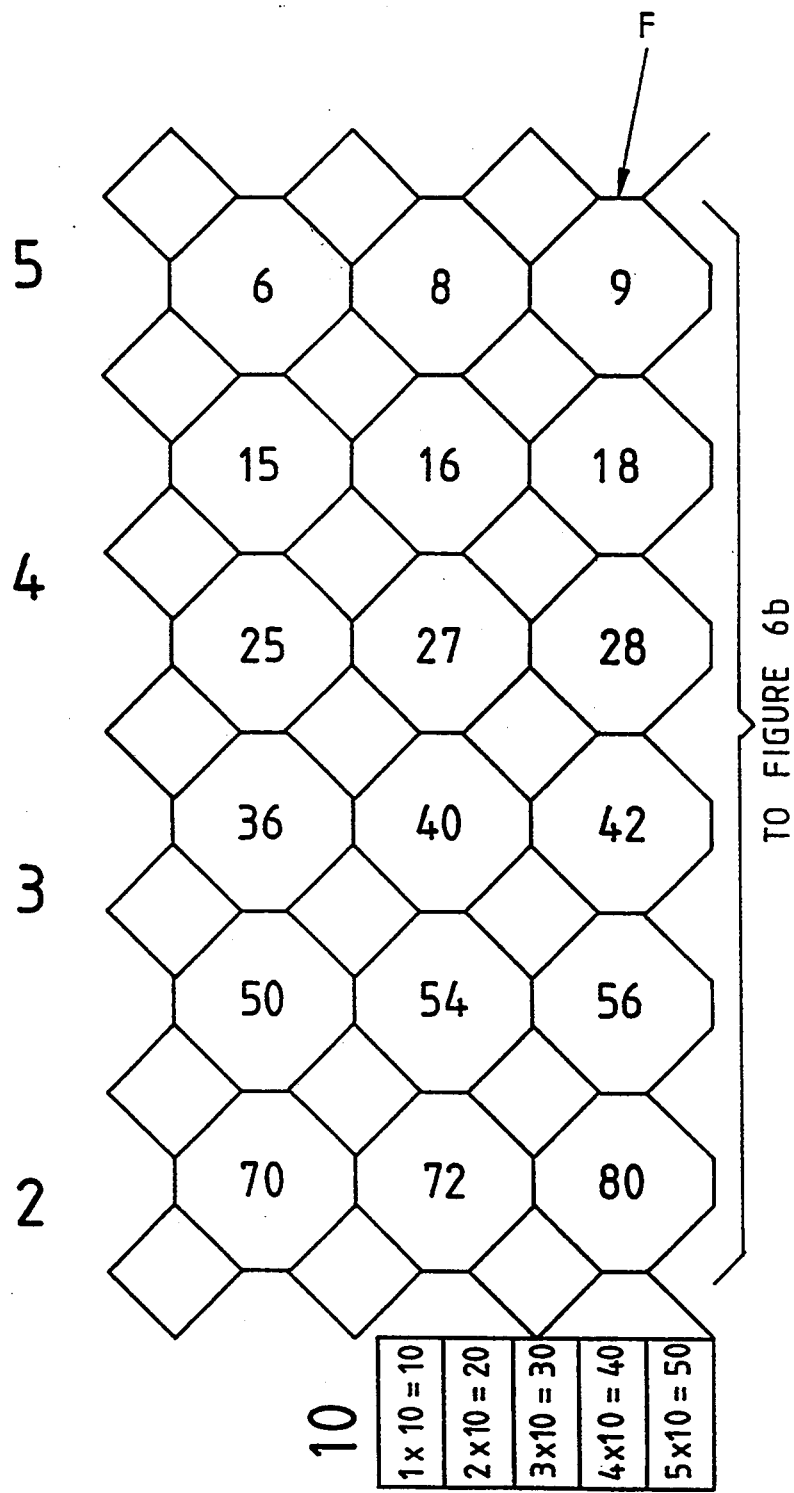
FIGS. 6a and 6b are divided sections of a plan view of an alternative version of the game board.
Figure 6B:
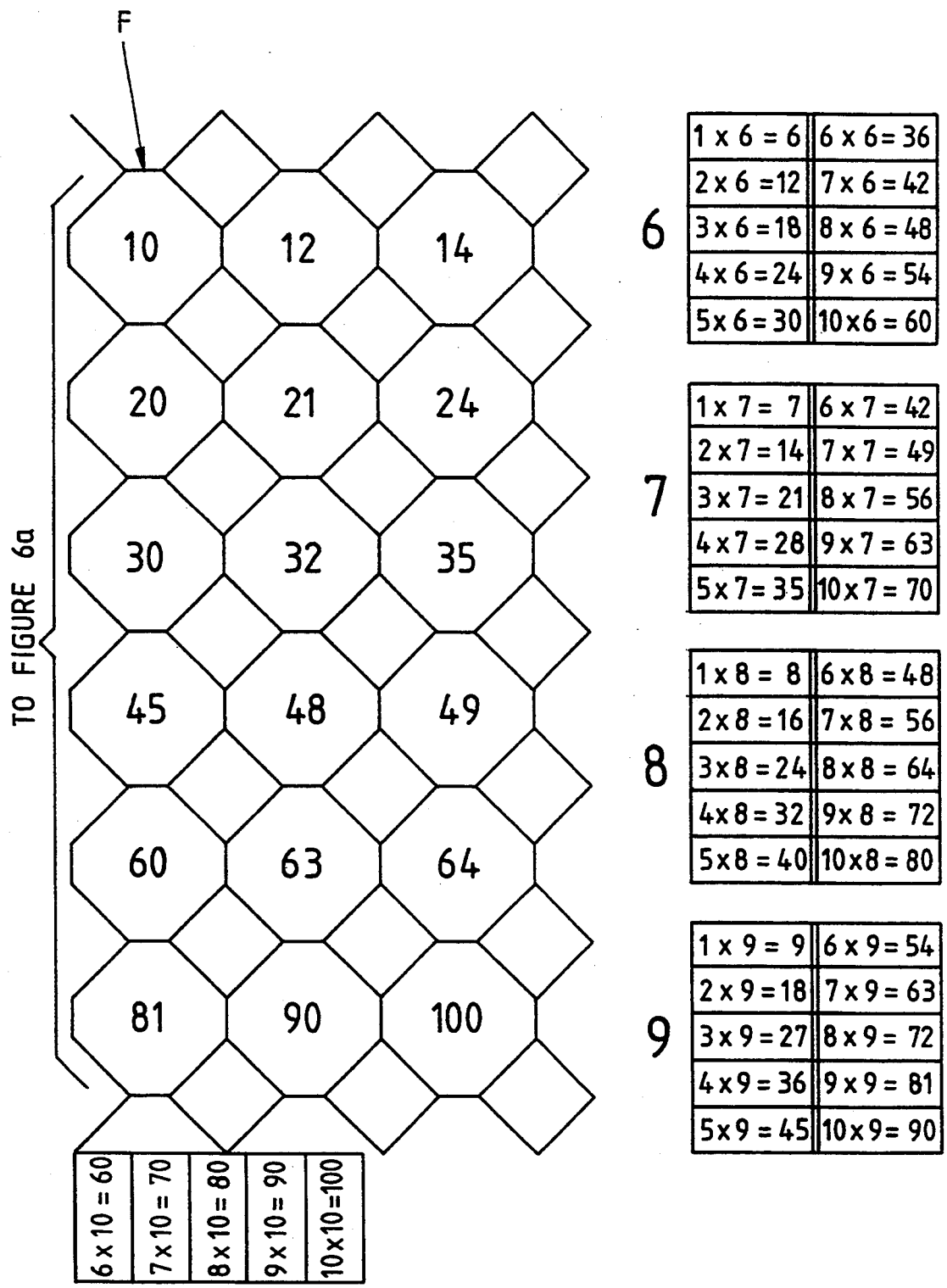

FIG. 3A of the extended version of the game in FIG. 2a has the same configuration as that of FIG. 6a and 6b.

The difference of the two games, one in FIG. 6a and 6b and the other in FIG. 8a and 8b are:

1. FIG. 6a and 6b show whole numbers only (e.g. 6, 8, 10, 12 and so on up to 100), whereas FIGS. 8a and 8b show whole numbers (e.g. 2, 3, 5, 6, 7, 9 and so on) as well as mixed numbers (e.g 2½, 7½, 12½ etc).

2. Each player in the game of FIGS. 6a and 6b uses 10 counters bearing whole numbers 2 to 10. Whereas a player in the game of FIGS. 8a and 8b uses 12 counters bearing whole numbers 2, 3, 4, 5, 6, 7 and mixed numbers ½, 1½, 2½, 3½, 4½, 5½. If the player in the game of FIGS. 8a and 8b wants to capture a disc bearing 7½ he places a counter bearing 1½ on one side of the disc and a counter bearing 5, on the other side. A capture is made as 5×1½=7½.

As in the game of FIGS. 6a and 6b, there are altogether 36 discs in FIGS. 8a and 8b comprising 18 red and 18 yellow. The rules for both the games are the same.

Figure 9:
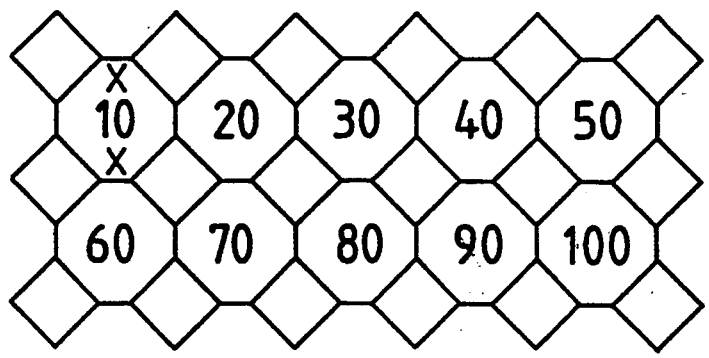
FIG. 9 illustrates a practice board, for use as a teaching aid in conjunction with the apparatus of FIG. 4.

Referring now to FIG. 9 as a guide, parents help the children to build up the same pattern, with discs marked with the same numbers, as in FIG. 9, on the practice board as the pupils endeavour to learn steps 1 to 10 from FIG. 4. FIG. 9 is covered from pupils only.

First Pupil Reads Aloud Step 1: 1 lot of 10=10

Teacher and pupils repeat the step several times. Pupils count the first line of 10 colored marbles to verify the answer. A disc marked 10 is placed on the practice board, on the first octagon marked with two crosses.

Second Pupil Reads Aloud Step 2: 2 lots of 10=10

Teacher and pupils repeat the step several times. Pupils count the first two lines of ten colored marbles to verify the answer. A disc marked 20 is placed on the practice board, on the octagon next to 10.

Next Pupil Reads Aloud Step 3: 3 lots of 10=30

Teacher and pupils repeat the step several times. Pupils count the first three lines of colored marbles to verify the answer. A disc marked 30 is placed on the practice board on the octagon next to 20.

Pupils read up to step 10 and fill up the octagons on the practice board with discs in the same order as shown in the above FIG. 9. At the end of the exercise the discs are removed.

Once all of the above steps have been worked through, the following questions are asked by the teacher:

1. What is 1 lot of 10?
2. What are 2 lots of 10s?
3. What are 3 lots of 10s?
4. What are 4 lots of 10s?
5. What are 5 lots of 10s?
6. What are 6 lots of 10s?
7. What are 7 lots of 10s?
8. What are 8 lots of 10s?
9. What are 9 lots of 10s?
10. What are 10 lots of 10s?

Answers can be found from step 1 to step 10 in FIG. 4 and in FIG. 9. They are covered for pupils only. For every question, pupils count the specified lots of 10's from the lines of marbles, for answers.

Wrong answers are corrected. Each correct answer is rewarded with a point.

PROCEDURES

Teacher asks the questions above in sequence. Pupils gradually fill in the octagons on the board with the discs marked with answers, in the same order, as shown in FIG. 9. The first number in FIG. 4 is always placed on the first octagon marked with two crosses.

OPTIONAL

Teacher asks the questions at random. Pupils place the discs with the right answers on the right octagons on the practice board.

Figure 10:
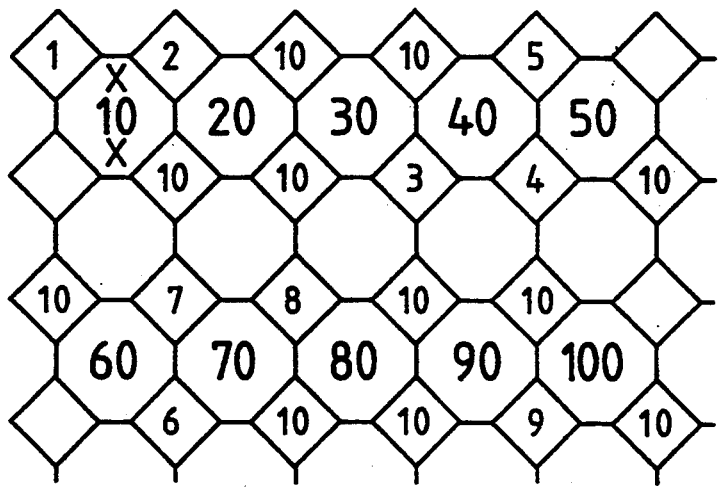
FIG. 10 illustrates a further version of a practice board.

FIG. 10 illustrates the principles of division. Referring to FIG. 10 as a guide, parents lay the discs, marked with the same numbers, in the same order and form as in FIG. 10 on the practice board and help the children to learn the concept of division with counters marked with numbers. FIG. 10 is covered from pupils only. The teacher (parent) asks the following questions:

How many lots of 10's are on the:
1. disc marked 10?
2. disc marked 20?
3. disc marked 30?
4. disc marked 40?
5. disc marked 50?
6. disc marked 60?
7. disc marked 70?
8. disc marked 80?
9. disc marked 90?
10. disc marked 100?

Notice: Only in game $Q_1$ the lines of discs are separated by an empty line of octagons.

Children take their turn to answer the questions. Counters can be laid in any manner as shown, while answering the questions as below.

ANSWERS

Answers can be found from Step 1 to Step 10 in FIG. 4 and in FIG. 10. They are covered for pupils only.

Parents encourage their children to seek out the answers together from the numbers in the vertical number-line and from the lines of marbles only.

Wrong answers are corrected. Each correct answer is rewarded with a point.

The following notes are given as a guide to parents/teachers when working through the division questions 1 to 10 above.

Question 1

The answer is 1 TEN (See step 1, FIG. 4). Two counters marked 1 and 10 are placed one on either side of the disc marked 10. The disc is declared as captured but stays on the board (See FIG. 10).

Question 2

The answer is 2 TENS (See step 2, FIG. 4). Two counters marked 2 and 10 are placed one on either side of the disc marked 20 in any manner. The disc is declared as captured but stays on the board (see FIG. 10).

Question 3

The answer is 3 TENS (See step 3, FIG. 4). Two counters marked 3 and 10 are placed one on either side of the disc marked 30. The disc is declared as captured but stays on the board (see FIG. 10).

Pupils gradually answer up to question 10. Counters and discs are left on the board until the game finishes. Pupils compare their points gained for correct answers. Counters are removed. Teacher asks the questions at random.

GAME $Q_2$

For the game $Q_2$ the discs, with answers from FIG. 4, are arranged on the practice board (FIG. 14a and 14b) in the same order and form as in FIG. 9. Two players play this game pitting their multiplication and division skills against each other to capture as many discs as possible. Each player plays alternately and collects the discs captured by him as his prize.

Rules for Game $Q_2$

1. Each player places his 10 counters marked blank, 1, 2, 3, 4, 5, 6, 7, 8, 9, 10, in that order on the counter-yard on the practice board.
2. To capture a disc two counters from the same set must be placed one on either side of the disc and the multiplication of the counter-numbers must equal the disc-number. The player collects the disc as his prize.
3. The blank counter can be given different numbers at different times by its players to capture a disc. The number given should always be announced.
4. If the blank counter is used to capture a disc the player does not win another chance to play again on that turn. The turn passes to his opponent.
5. A player on his turn can bring a maximum of two counters, from the counter-yard at one go on to the practice board for strategic purposes:
    a) the counters may jointly capture a single disc, or
    b) the counters may each separately capture single disc, or
    c) one counter may capture a disc and the other may target a disc, or
    d) both of the counters may each separately target a disc or may be placed anywhere. Whether any capture is made or not the turn passes onto his opponent.
6. A player on his turn can move only one of his counters, already on the practice board, from one place to another. Everytime he makes a capture in that process he wins another chance to play again on that turn either by rule 4 or by rules 5 or 6, otherwise the turn passes on to his opponent.
7. A player is not allowed to move or use his opponent's counter for capture.
8. A player is allowed to place his own counter on his opponent's counter without blocking the activities of his opponent's counter.
9. The winner collects the maximum number of discs. Each disc carries one point.

Game $Q_2$ is the final exercise after which the pupils start playing the upgraded games on the 10 times table, shown in FIGS. 11 and 12, along with the "General Rules" that govern the games.

Figure 13:
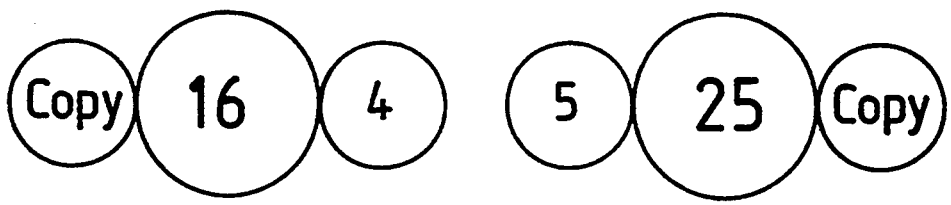
FIG. 13 illustrates an example of rule 3 for the games of FIGS. 11 and 12.
Figure 15B:
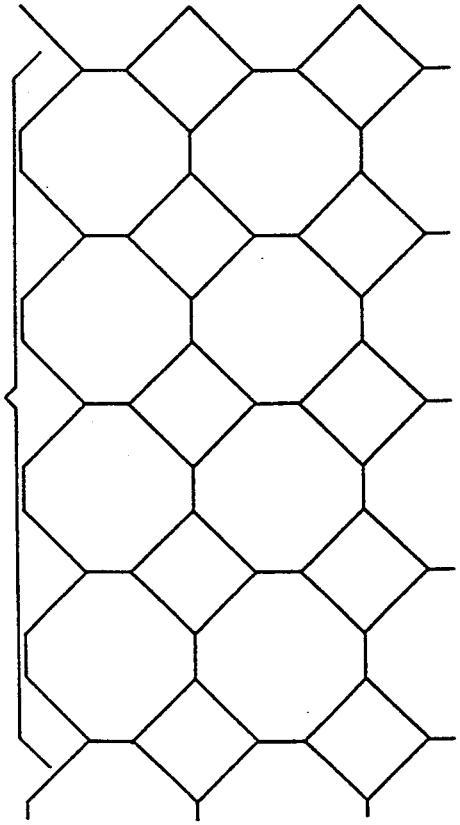

Referring now to the game board shown in FIGS. 15a and 15b, this is used to play upgraded games listed in FIGS. 11 and 12, in accordance with the following rules:

1. Each player places his set of 10 colored counters marked, copy, 2, 3, 4, 5, 6, 7, 8, 9, 10, in that order on the counter-yard on the game board.
2. To capture a disc two counters from the same set must be placed one on either side of that disc and the multiplication of the counter-numbers must equal the disc-number. The player collects the disc as his prize.
3. Copy-counter duplicates (copies) the number on the other counter placed on the opposite side of the disc targeted for capture (see FIG. 13). Copy-counter is used used to capture square numbers only, e.g. 9, 16, 25, 36, 49, 64, 81, 100.
4. The game is played alternately between two players.
5. A player on his turn can bring one or a maximum of two counters, from the counter-yard at one go, on to the game board for strategic purposes:
    a) the counters may jointly capture a single disc, or
    b) the counters may each separately capture a single disc, or
    c) one counter may capture a disc and the other may target a disc, or
    d) both the counters may each separately target a disc or may be placed anywhere.

Even if a capture is made the player does win another chance to play again on that turn because the disc or the discs were brought from the counter-yard. The turn passes on to his opponent.

6. A player on his turn can move only one of his counters already on the practice board from one place to another. Everytime he makes a capture in that process he wins another chance to play again on that turn either by rule 5 or by rule 6.
7. A player is not allowed to:
    a) place his own counter on his opponent's counter,
    b) move or use his opponent's counter for capture.
8. The winner collects the maximum number of discs. Each disc carries one point.

NOTE: All the listed games are played on the game board (FIGS. 15a and 15b);

All the multiplication tables are always played on the practice board (FIGS. 14a and 14b), with the first disc being placed on the octagon with the two crosses (see FIG. 9).

We claim:

1. Game apparatus which comprises:
    (a) a board bearing a regular pattern comprising a plurality of adjoining octagonal units arranged in horizontal rows and vertical columns and a plurality of square units interposed between the octagonal units;

(b) a series of markers each bearing a numeral and being placed at the commencement of the game on said octagonal units;

(c) two series of counters, one for each player or team of players, each series of counters comprising a number of counters each of which bears a numeral;

(d) a first counter-yard located in the region of one edge of the board for receiving the counters of one player or team of players;

(e) a second counter-yard located in the region of the opposite edge of the board for receiving the counters of the other player or team of players.

2. Apparatus according to claim 1, in which each series of counters comprises at least ten counters, the first nine of which bear the numerals "2" through "10" successively and the eleventh of which is blank.

3. Apparatus according to claim 1, in which the counters of one series are colored differently to the counters of the other series.

4. Apparatus according to claim 1, in which the markers are provided in two different colors.

5. Apparatus according to claim 1, in which a plurality of the numerals are integers.

6. Apparatus according to claim 1, in which a plurality of the numerals are fractions.

7. A method of playing a game, which comprises:
(a) providing a game board having a regular pattern comprising a plurality of adjoining octagonal units arranged in horizontal rows and vertical columns and a plurality of square units interposed between the octagonal units, a first counter-yard located in the region of one edge of the board and a second counter-yard located in the region of the opposite edge of the board;

(b) providing a series of markers each bearing a numeral;

(c) providing a first series of counters for a first player or team of players, comprising a number of counters each of which bears a numeral;

(d) providing a second series of counters for a second player or team of players comprising a number of counters each of which bears a numeral;

(e) disposing at least some of said first series of counters in said first counter-yard at the commencement of the game;

(f) disposing at least some of said second series of counters in said second counter-yard at the commencement of the game;

(g) disposing at least some of said markers on said octagonal units at the commencement of the game;

(h) moving alternately said first and second counters from said counter-yards onto said square units or from one square unit to another square unit; and (i) capturing a marker by placing two counters from the same series on either side of said marker such that a mathematical operation performed on the numerals on said two counters equals the numeral on said marker.

8. A method of playing a game according to claim 7, in which each marker captured represents at least one point which is added to the score of the player or team of players who captured that marker.

9. A method of playing a game according to claim 8, in which the series of markers is provided in two different colors, the markers of one color representing a greater or lesser number of points than that represented by the markers of the other color.

10. A method of playing a game according to claim 7, in which the winner of the game is the player or team of players who gains the greater number of points or markers or both.

* * * * *